US008213730B2

(12) United States Patent
Kawazoe et al.

(10) Patent No.: US 8,213,730 B2
(45) Date of Patent: Jul. 3, 2012

(54) SERVER, SCREEN TRANSMITTING METHOD, AND PROGRAM STORAGE MEDIUM

(75) Inventors: Hiroshi Kawazoe, Kawasaki (JP); Shogo Yamaguchi, Kawasaki (JP); Shinya Murai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 647 days.

(21) Appl. No.: 12/382,492

(22) Filed: Mar. 17, 2009

(65) Prior Publication Data

US 2010/0054618 A1 Mar. 4, 2010

(30) Foreign Application Priority Data

Aug. 27, 2008 (JP) ................................. 2008-218170

(51) Int. Cl.
G06K 9/36 (2006.01)
(52) U.S. Cl. ........................................ 382/239; 382/232
(58) Field of Classification Search .................. 382/232, 382/239; 715/243, 246, 272
See application file for complete search history.

(56) References Cited

U.S. PATENT DOCUMENTS

| 5,638,498 | A | 6/1997 | Tyler et al. ................... 358/1.18 |
|---|---|---|---|
| 5,949,968 | A | 9/1999 | Gentile ........................ 358/1.16 |
| 7,360,230 | B1 | 4/2008 | Paz et al. .......................... 725/47 |
| 7,702,171 | B2 | 4/2010 | Murai et al. .................. 382/243 |
| 7,712,026 | B2* | 5/2010 | Kobashi et al. ............... 715/243 |
| 7,757,167 | B2* | 7/2010 | Kobashi et al. ............... 715/243 |
| 7,881,369 | B2 | 2/2011 | Murai et al. ............ 375/240.01 |
| 2002/0030843 | A1 | 3/2002 | Tuli .............................. 358/1.15 |
| 2003/0017846 | A1 | 1/2003 | Estevez et al. ................. 375/148 |
| 2004/0042506 | A1 | 3/2004 | Fallon et al. ..................... 341/51 |
| 2004/0095601 | A1 | 5/2004 | Ozawa .......................... 382/239 |
| 2004/0184664 | A1 | 9/2004 | Tuli .............................. 709/217 |
| 2006/0222246 | A1 | 10/2006 | Murai et al. .................. 382/243 |
| 2006/0274957 | A1 | 12/2006 | Suzuki et al. .................. 358/1.9 |

FOREIGN PATENT DOCUMENTS

| JP | 10-126773 | 5/1998 |
|---|---|---|
| JP | 2003-299049 | 10/2003 |
| JP | 2004-086550 | 3/2004 |
| JP | 2006-285302 | 10/2006 |
| JP | 2006-338226 | 12/2006 |

OTHER PUBLICATIONS

Richardson, Tristan et al., "The RFB Protocol", Version 3.3, (Jan. 1998), pp. 1-26.
Murai et al., U.S. Appl. No. 11/389,136, filed Mar. 27, 2006.

* cited by examiner

*Primary Examiner* — Anh Hong Do
(74) *Attorney, Agent, or Firm* — Nixon & Vanderhye, P.C.

(57) ABSTRACT

A server includes a generating unit which generates image data in a partial region of a displayed image on the screen; a type identifying unit configured to identify a type of a GUI component included in the region of the generated image data; a storage which stores compression property information for each GUI component type; a compression scheme deciding unit which decides a compression scheme based on compression property information corresponding to the GUI component type identified; a compression unit which compresses the generated image data with a decided compression scheme; a transmission unit which transmits the compressed data to the client terminal; an update frequency deciding unit which decides a update frequency of the compression property information in the storage for each type of the GUI component; and an updating unit which updates the compression property information with the update frequency decided for each type of the GUI component.

13 Claims, 17 Drawing Sheets

| GUI COMPONENT TYPE | COMPRESSION PROPERTY INFORMATION ||
| --- | --- | --- |
| | JPEG COMPRESSION RATIO | PNG COMPRESSION RATIO |
| DOCUMENT EDITING: DISPLAY PORTION | 50% | 60% |
| DOCUMENT EDITING: SCROLL BAR PORTION | 40% | 20% |
| DOCUMENT EDITING: BUTTON PORTION | 30% | 10% |
| DOCUMENT EDITING: TITLE BAR PORTION | 30% | 40% |

FIG. 5

| GUI COMPONENT TYPE | UPDATE FREQUENCY INFORMATION |
|---|---|
| | DESCRIPTION ON TEMPORAL TREND OF IMAGE DATA CHARACTERISTICS |
| DOCUMENT EDITING: DISPLAY PORTION | DISPLAYS BOTH MONOTONIC PICTURES AND NATURAL PICTURES |
| DOCUMENT EDITING: SCROLL BAR PORTION | DISPLAYS ALMOST ENTIRELY MONOTONIC IMAGES |
| DOCUMENT EDITING: BOTTON PORTION | DISPLAYS ALMOST ENTIRELY MONOTONIC IMAGES |
| MOVING PICTURE VIEWING: PLAY DISPLAY PORTION | DISPLAYS ALMOST ENTIRELY NATURAL IMAGES |

FIG. 7

| GUI COMPONENT TYPE | UPDATE FREQUENCY INFORMATION |
|---|---|
| | HISTORY OF COMPRESSION SCHEMES |
| DOCUMENT EDITING: DISPLAY PORTION | PNG→JPEG→JPEG→PNG→JPEG |
| DOCUMENT EDITING: SCROLL BAR PORTION | PNG→PNG→PNG→PNG→PNG |
| DOCUMENT EDITING: BUTTON PORTION | PNG→PNG→PNG→PNG→PNG |
| MOVING PICTURE VIEWING: PLAY DISPLAY PORTION | JPEG→JPEG→JPEG→JPEG→JPEG |

FIG. 9

| GUI COMPONENT TYPE | UPDATE FREQUENCY INFORMATION | |
|---|---|---|
| | COMPRESSION SCHEME | NUMBER OF SUCCESSIVE SELECTIONS |
| DOCUMENT EDITING: DISPLAY PORTION | JPEG | 1 |
| DOCUMENT EDITING: SCROLL BAR PORTION | PNG | 10 |
| DOCUMENT EDITING: BUTTON PORTION | PNG | 7 |
| MOVING PICTUTRE VIEWING: PLAY DISPLAY PORTION | JPEG | 5 |

FIG. 10

| NUMBER OF SUCCESSIVE SELECTIONS | ELAPSED TIME THRESHOLD |
|---|---|
| 1 | 1.0 SEC. |
| 2 | 2.0 SEC. |
| 3 | 4.0 SEC. |
| 4 | 8.0 SEC. |
| ... | ... |
| n | $2^{n-1}$ SEC. |

FIG. 12

| GUI COMPONENT TYPE | UPDATE FREQUENCY INFORMATION ||
| --- | --- | --- |
| | HISTORY OF JPEG COMPRESSION RATIO | HISTORY OF PNG COMPRESSION RATIO |
| DOCUMENT EDITING: DISPLAY PORTION | 30%→40%→50% | 50%→30%→60% |
| DOCUMENT DITING: SCROLL BAR PORTION | 40%→40%→40% | 30%→20%→20% |
| DOCUMENT EDITING: BUTTON PORTION | 20%→30%→30% | 10%→20%→20% |
| MOVING PICTURE VIEWING: PLAY DISPLAY PORTION | 30%→30%→30% | 50%→50%→60% |

FIG. 13

| GUI COMPONENT TYPE | | UPDATE FREQUENCY INFORMATION | | |
|---|---|---|---|---|
| | | TIME 1 | TIME 2 | TIME 3 |
| DOCUMENT EDITING: DISPLAY PORTION | | 35000 | 50000 | 51000 |
| | JPEG | 30% | 40% | 50% |
| | PNG | 50% | 30% | 60% |
| DOCUMENT EDITING: SCROLL BAR PORTION | | 50000 | 51000 | 52000 |
| | JPEG | 40% | 40% | 40% |
| | PNG | 30% | 20% | 20% |
| DOCUMENT EDITING: BUTTON PORTION | | 50000 | 52000 | 54000 |
| | JPEG | 20% | 30% | 30% |
| | PNG | 10% | 20% | 20% |
| MOVING PICTURE VIEWING: PLAY DISPLAY PORTION | | 51000 | 52000 | 54000 |
| | JPEG | 30% | 30% | 30% |
| | PNG | 50% | 50% | 60% |

FIG. 14

| NUMBER OF SUCCESSIVE SELECTIONS | CUMULATIVE AREA THRESHOLD |
|---|---|
| 1 | 10% |
| 2 | 20% |
| 3 | 40% |
| 4 | 80% |
| ... | ... |
| n | $10*2^{n-1}\%$ |

FIG. 16

SERVER, SCREEN TRANSMITTING METHOD, AND PROGRAM STORAGE MEDIUM

CROSS REFERENCE TO RELATED APPLICATIONS

This application is based upon and claims the benefit of priority from the prior Japanese Patent Applications No. 2008-218170, filed on Aug. 27, 2008; the entire contents of which are incorporated herein by reference.

BACKGROUND OF THE INVENTION

1. Field of the Invention

The present invention relates to a server, a screen transmitting method, and a program storage medium storing a computer program for compressing image data on a screen and transmitting compressed data to a client terminal.

2. Related Art

There are screen sharing systems for delivering a desktop image on a screen in the form of packets from a server terminal (or server) to a client terminal in real time via a network. Such a screen sharing system allows a desktop image on one of the terminals to be shared by remote users on the both ends and can realize an efficient environment for collaborative activity across two locations via a network.

Methods for building of a screen sharing system include one that delivers what is being drawn on the entire desktop area of a server to a client terminal at regular time intervals and one that delivers only a modified portion together with its drawing coordinates every time an update has taken place in a drawing area on the desktop area. The latter method of delivering a difference has advantages of being able to utilize network bandwidths more efficiently and, furthermore, provide a large number of drawing frames per unit time when compared to the former method because data is generated only for a necessary portion in accordance with change in what is being drawn. Therefore, many of currently provided screen sharing systems provide their services using the mechanism of delivering only difference data.

When image data obtained on the server is transmitted, a technique of compressing the data with an appropriate compression scheme to reduce the amount of data and network load is generally employed. Various types of compression scheme are available for such compression. For instance, Joint Photograph Experts Group (JPEG) quantizes high-frequency components of image data more coarsely than low-frequency components so as to enable compression with at a high compression ratio especially for natural images such as photographic images. Portable Network Graphics (PNG) utilizes "gzip" (GNUzip) to enable compression at a high compression ratio especially for monotonic images such as character images. In general, an image drawn on the desktop of a server contains images having such various compression properties as mentioned above. Therefore, for efficient transmission of image data in a small data amount, it is required to select a scheme that exhibits a higher compression ratio with reference to information about compression properties of image data (compression property information).

A technique described in JP-A 10-126773 (Kokai) enables efficient reduction of data amount by applying a number of compression schemes to image data to be transmitted and at this time adopting a compression scheme having a higher compression ratio.

A technique described in JP-A 2006-338226 (Kokai) also enables acquisition of a data reduction effect by calculating the number of colors used in image data from a bitmap of the image data and identifying an appropriate compression scheme in accordance with the number of colors.

JP-A 2006-285302 (Kokai) discloses a method that focuses on the types of graphical user interface (GUI) components contained in image data. In an image displayed on the desktop of a server, various types of GUI components can be present. Thus, utilizing the property of similarity in compression properties possessed by image data contained in GUI components of the same type, the JP-A 2006-285302 (Kokai) stores information that shows compression properties corresponding to GUI component types and decides a compression scheme with reference to the information. It thereby can select a compression scheme appropriate for the property of a displayed image and compress the image at a high compression ratio.

The techniques described in JP-As 10-126773 and 2006-338226 (Kokai's) can select a suited compression scheme through a determination process on image data to be transmitted, such as comparing amounts of data compressed with plural compression schemes or analyzing the number of colors. However, they have to apply such a determination process to all image data to be transmitted and thus have the problem of increased load on a CPU.

Meanwhile, the technique described in JP-A 2006-285302 (Kokai) enables selection of an appropriate compression scheme by storing compression property information for each GUI component type and making reference to this information when deciding a compression scheme. However, this technique requires update of compression property information at certain time intervals in order to keep accuracy of selecting an appropriate compression scheme high, and has the problem of occurrence of update that would have been unnecessary when both GUI components for which compression property information significantly varies over time and ones for which such information is almost invariant exist together. That is to say, to keep the accuracy of compression property information relating to GUI components of the former type high, time interval of update should be set to a short period in advance, but it in turn causes repetitive update of information on GUI components of the latter type, which does not require frequent updating. As a result, processing that would not have been necessary is imposed on a CPU.

Thus, conventional techniques have the problem of difficulty in achieving compatibility between appropriate selection of a compression scheme for application to image data and reduction of CPU load associated with processing required for selecting an appropriate compression scheme.

SUMMARY OF THE INVENTION

According to an aspect of the present invention, there is provided with a server that compresses image data in at least a partial region of a displayed image on a screen including graphical user interface (GUI) components of plural types and transmits compressed data to a client terminal, the server comprising: an image data generating unit configured to generate image data in at least a partial region of a displayed image on the screen; a type identifying unit configured to identify a type of a GUI component included in the region of the generated image data; a first storage configured to store compression property information of image data for each type of GUI component; a compression scheme deciding unit configured to decide a compression scheme based on compression property information corresponding to the GUI component type identified by the type identifying unit; a compression unit configured to compress the generated image data with a decided compression scheme to generate compressed data; a transmission unit configured to transmit the compressed data to the client terminal; an update frequency deciding unit configured to decide a update frequency of the compression property information corresponding to each type of the GUI component in the first storage; and an updating unit configured to update the compression property information corresponding to the update frequency decided for each type of the GUI component.

BRIEF DESCRIPTION OF THE DRAWINGS

FIG. 5 shows an example of compression property information;

FIG. 7 shows a first example of update frequency information;

FIG. 9 shows a second example of update frequency information;

FIG. 10 shows a third example of update frequency information;

FIG. 12 shows a table that associates the numbers of successive selections shown in the update frequency information of FIG. 10 with elapsed time threshold values;

FIG. 13 shows a fourth example of update frequency information;

FIG. 14 shows a fifth example of update frequency information;

FIG. 16 shows a table that associates the numbers of successive selections shown in the update frequency information of FIG. 10 with cumulative area threshold values.

DETAILED DESCRIPTION OF THE INVENTION

Hereinafter, an embodiment of the present invention will be described with reference to accompanying drawings.

Figure 1:
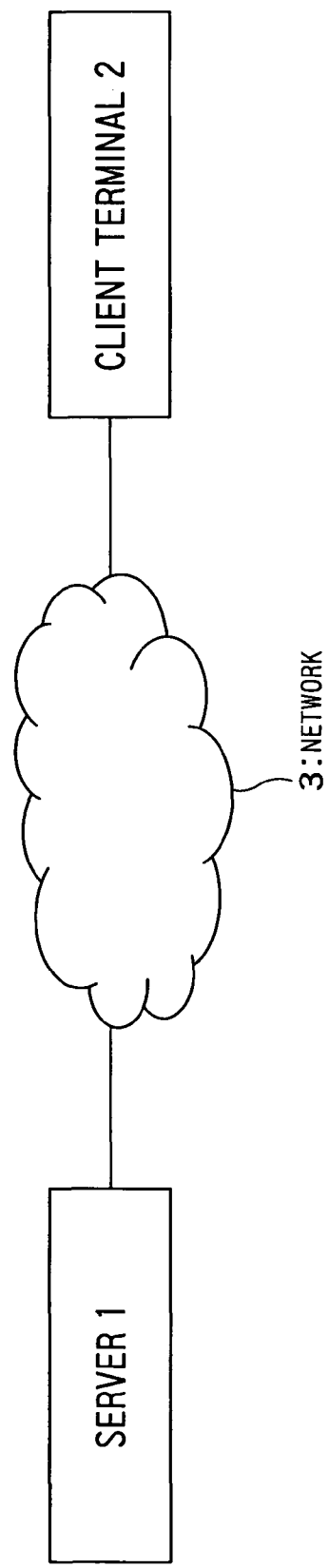
FIG. 1 shows a configuration of a screen sharing system according to an embodiment of the present invention.

FIG. 1 shows a configuration of a screen sharing system according to an embodiment of the present invention. The screen sharing system includes an information processing terminal apparatus (a server) 1 that functions as a server, and an information processing terminal apparatus (a client terminal) 2 which is connected to the server 1 via a network 3 and functions as a client. The server 1 implements screen sharing with the client terminal 2 via the network 3. On a screen of the server 1, an image including graphical user interface (GUI) components of plural types is displayed. The server 1 compresses and packetizes image data on the entire or a partial region of the desktop screen and delivers the data in real time.

Figure 2:
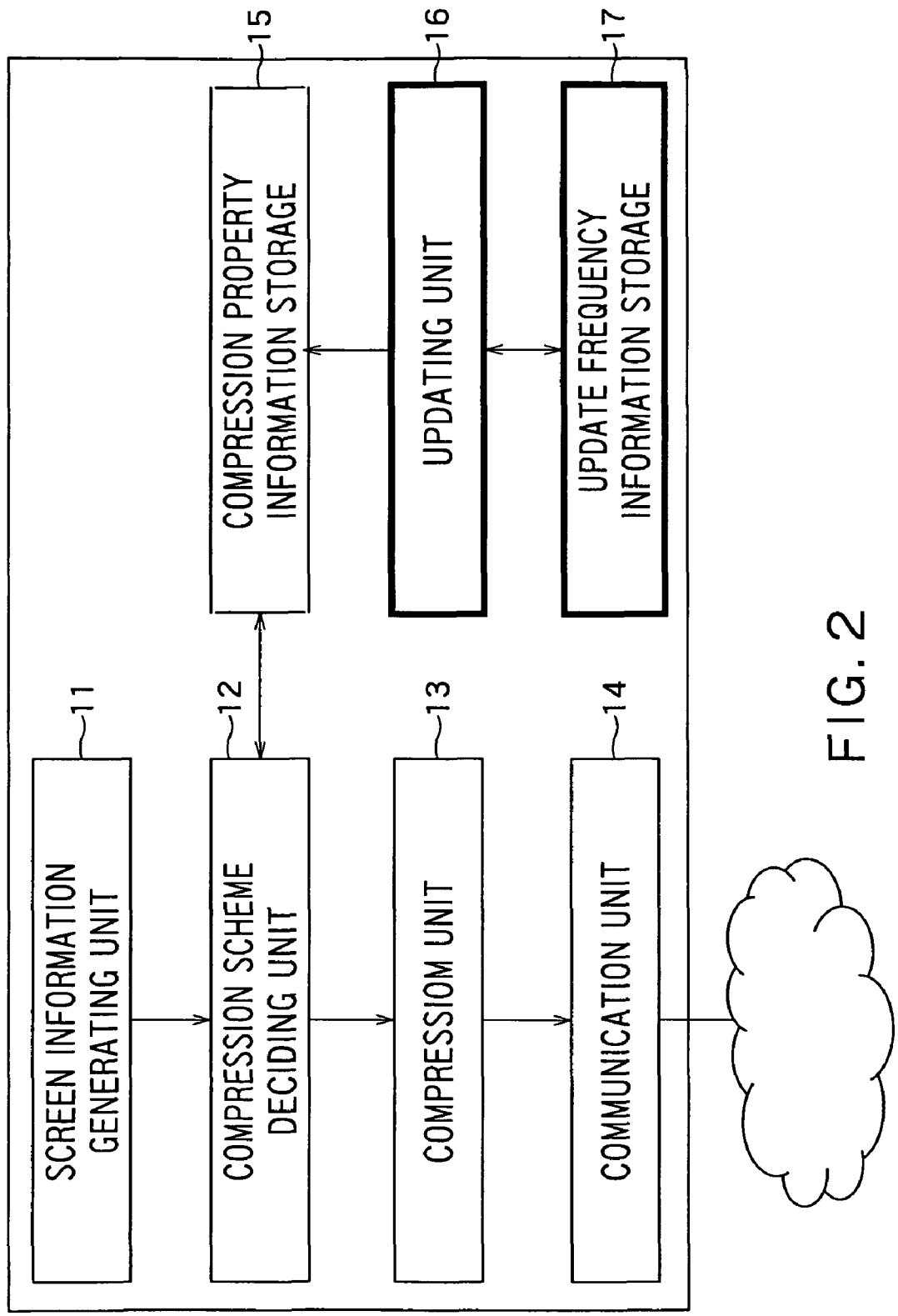
FIG. 2 is a block diagram showing an internal configuration of a server.

FIG. 2 is a block diagram showing an internal configuration of the server 1.

The server 1 includes, as its components, a screen information generating unit 11, a compression scheme deciding unit 12, a compression unit 13, a communication unit 14, a compression property information storage (first storage) 15, an updating unit 16, and an update frequency information storage (second storage) 17. Among these components, provision of the updating unit 16 and the update frequency information storage (second storage) 17 in particular is one of key characteristics of the present embodiment. Hereinafter, overviews of the individual components are described first and then their detailed operations are shown.

The screen information generating unit 11 generates screen information (including image data and on-screen position information for the image data) in accordance with the operational states of an Operating System (OS) and various applications executed on the server 1.

The compression scheme deciding unit 12 identifies the type of a GUI component to which a region occupied by image data generated by the screen information generating unit 11 on the entire screen belongs. The compression scheme deciding unit includes a type identifying unit for identifying the type of a GUI component.

In a document editing application, for example, there can be a display portion for displaying characters entered and/or pictures inserted by a user, a scroll bar portion for changing a display position, a button portion for calling functions of an application, a title bar portion for displaying the title of a document being edited, and so forth. Or in a moving picture viewing application, there can be a play display portion for playing a moving picture, a control portion for controlling the playback position of the moving picture, an information display portion for indicating the title and/or artist's name of a moving picture being played back, and so forth.

The compression scheme deciding unit 12 obtains compression property information relating to a type of GUI component from the compression property information storage (first storage) 15 based on the type of the GUI component identified through the above-described procedure. Then, based on the compression property information obtained, the compression scheme deciding unit 12 decides a compression scheme for the generated image data.

The compression unit 13 compresses the image data to generate compressed data using the compression scheme selected by the compression scheme deciding unit 12.

The communication unit 14 transmits the compressed data generated by the compression unit 13, on-screen position information, and information indicating the selected compression scheme to the client terminal 2 over the network 3.

The compression property information storage (first storage) 15 has a table that associates GUI components types with compression property information. This table consists of entries indicating GUI types and entries indicating compression properties of image data that corresponds to those GUI types. Compression properties can be of various forms: they may be simply the best suited compression schemes, for example, or average compression ratios of plural compression schemes applied to image data, data representing the characteristics of image data, the maximum number of colors that can be used in image data, and/or an average compression time per unit area. The compression scheme deciding unit 12 decides a compression scheme to be applied to generated image data based on compression properties for each GUI component type.

The update frequency information storage (second storage) 17 has a table that stores update frequency information for deciding a frequency with which each piece of compression property information should be updated for each GUI component type. This table consists of entries indicating GUI types and entries indicating update frequency information corresponding to the GUI types. The update frequency information may be of various forms, including temporal trend of image data characteristics, past history of compression property information, or others to be discussed below. Specific examples of compression property information are described later in detail.

The updating unit 16 updates compression property information in the compression property information storage 15 with a frequency determined by update frequency information stored in the update frequency information storage 17 for each GUI component type. For a GUI component type that is updated, the updating unit calculates new compression property information and updates information in the compression property information storage 15 with the compression property information calculated. Specifically, the updating unit 16 outputs an instruction for update to the compression property information storage 15, and the compression property information storage 15 updates the compression property information for the GUI component type in question in accordance with the instruction from the updating unit 16.

Figure 3:
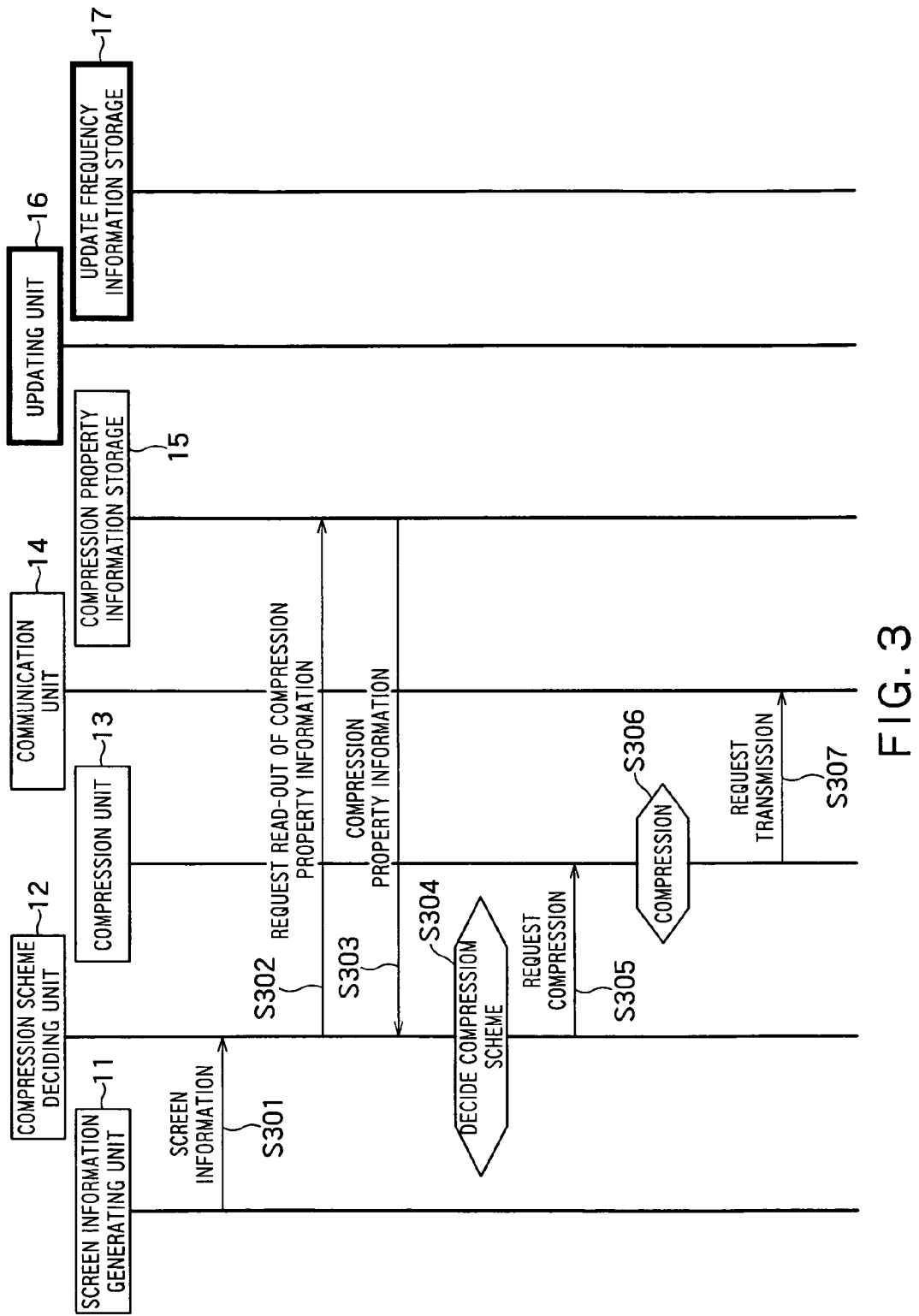
FIG. 3 illustrates an operational sequence between a screen information generating unit, a compression scheme deciding unit, a compression unit, a communication unit, and a compression property information storage.
Figure 4:
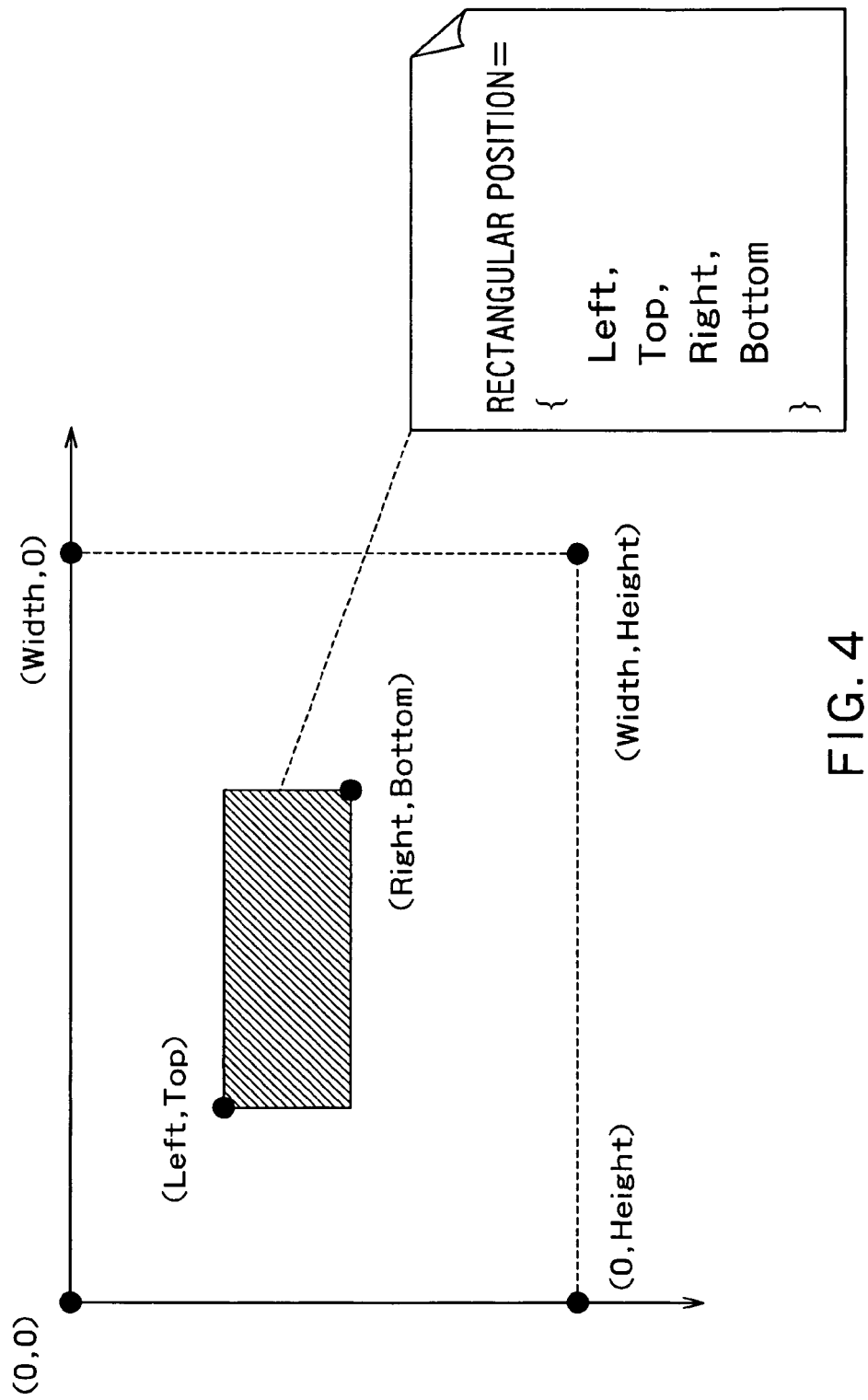
FIG. 4 illustrates rectangular position information.

FIG. 3 illustrates an operational sequence between the screen information generating unit 11, compression scheme deciding unit 12, compression unit 13, communication unit 14, and compression property information storage 15. FIG. 3 shows a flow from generation of image data to data transmission, which are performed on the server 1.

When screen sharing is being implemented, the screen information generating unit 11 generates image data in response to a change in operational states of the OS and various applications running on the server 1 and update of visual information presented to the user. The image data is a rectangular image representing a portion on the desktop which has been updated. The screen information generating unit 11 generates rectangular position information that shows the display position of the image on the desktop together with the image data.

The rectangular position information is the coordinate values of the upper left vertex of the rectangular shape of the updated image (Left, Top) and the coordinate values of the lower right vertex of the same (Right, Bottom) when the upper left corner of the desktop is defined as the origin of an x-y coordinate plane, the horizontal width of thereof as Width, and the vertical width thereof as Height. Hereinafter, the image data and the rectangular position information will be collectively called screen information.

The screen information generating unit 11 inputs screen information to the compression scheme deciding unit 12 (S301). While the present embodiment starts processing at a time when an update has been made to visual information presented to the user, this is not limitation. For example, image data on the entire desktop or in a partial region thereof may be captured at regular time intervals and rectangular position information may be added to the image data to generate screen information, or the image data may be compared to the result of the last capture to extract portions that have been changed.

When the screen information is input from the screen information generating unit 11, the compression scheme deciding unit 12 determines the GUI component type to which the region occupied by the image data belongs, from rectangular position information included in the screen information. The type may be determined by obtaining information about regions of GUI components being displayed on the desktop and identifying the type based on the information, for example. If the region indicated by the rectangular position information spans plural GUI components, a method that regards the type of any one of the GUI components as the result of determination or a method that subjects the screen information to splitting so that the region does not span plural GUI components may be employed. If splitting is applied, the following processing is performed on each piece of split screen information.

Then, when the GUI component type corresponding to the screen information has been identified, the compression scheme deciding unit 12 inputs the GUI component type identified to the compression property information storage 15 to request reading of compression property information (S302). In response to the request, the compression property information storage 15 makes reference to a table and outputs compression property information corresponding to the GUI component type to the compression scheme deciding unit 12 (S303). An example of the table is shown in FIG. 5.

FIG. 5 shows compression ratios (values calculated at the last update) of several GUI components compressed by JPEG and PNG compression schemes, as examples of compression property information. For instance, when input from the compression scheme deciding unit 12 is "document editing: scroll bar portion", the compression property information storage 15 outputs information of "JPEG compression ratio: 40% and PNG compression ratio: 20%".

The compression scheme deciding unit 12 then selects a compression scheme based on the compression property information provided (S304). The example of FIG. 5 assumes that JPEG, which provides a higher compression ratio, is selected. The compression scheme deciding unit 12 outputs the selected compression scheme to the compression unit 13 with screen information to request the compression unit 13 to compress the image data (S305).

Upon receiving the selected compression scheme and screen information from the compression scheme deciding unit 12, the compression unit 13 compresses image data included in the screen information using the selected compression scheme (S306). Upon completing the compression, the compression unit 13 outputs compressed data, rectangular position information, and the compression scheme to the communication unit 14 to request their transmission (S307).

Having received the compressed data, rectangular position information, and the compression scheme from the compression unit 13, the communication unit 14 creates data that includes them and is of a format transmittable over the network 3. The communication unit 14 transmits the created data to the client terminal 2.

Figure 6:
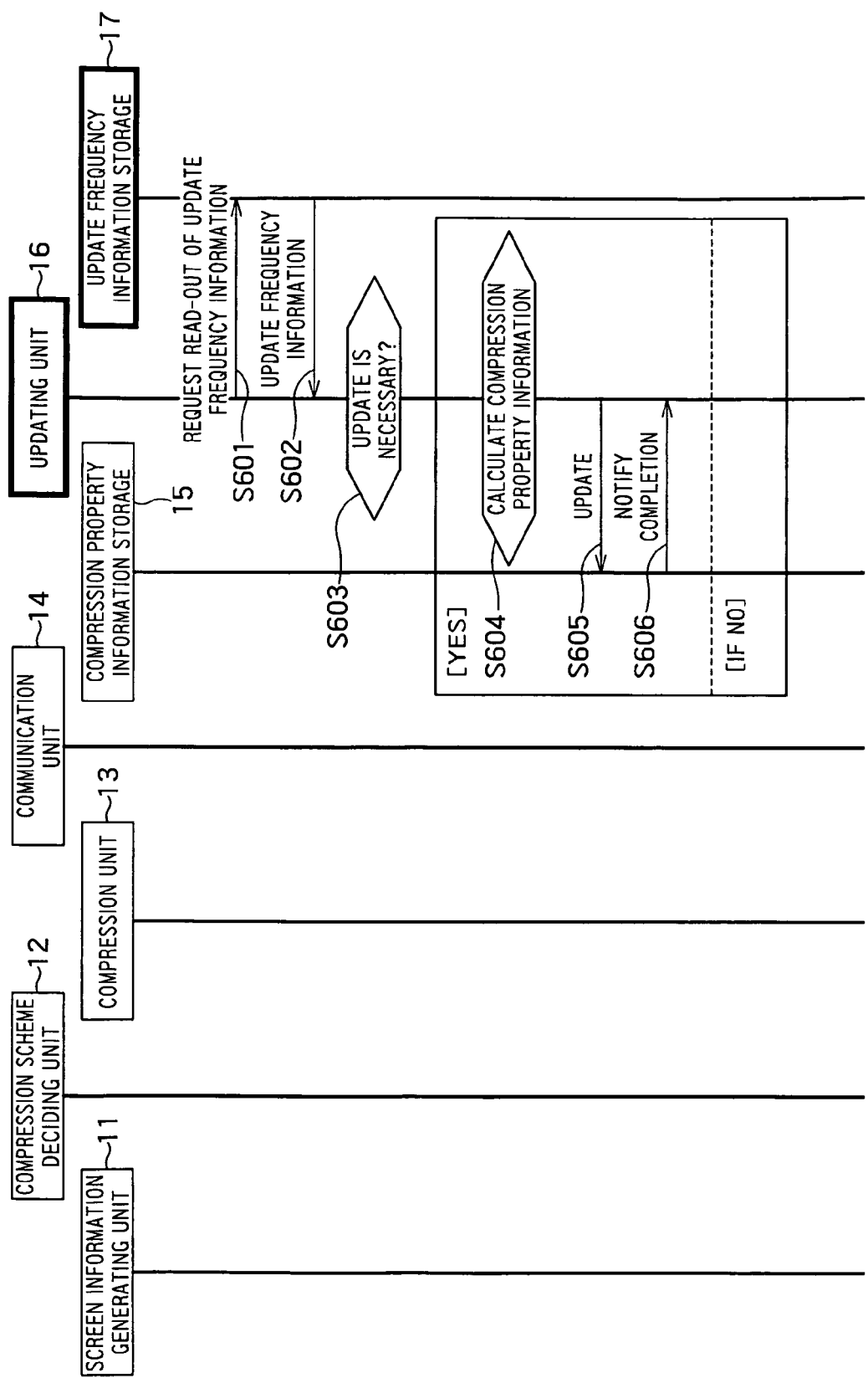
FIG. 6 illustrates an operational sequence between an updating unit, compression property information storage, and an update frequency information storage.

FIG. 6 illustrates an operational sequence between the updating unit 16, compression property information storage 15, and update frequency information storage 17. Hereinafter, basic operation of the updating unit 16 is described with reference to FIG. 6. The updating unit 16 performs the following processing at arbitrary repetitive time intervals.

The updating unit 16 first requests the update frequency information storage 17 to read out update frequency information for a certain GUI component type (step S601).

The update frequency information storage 17 retrieves update frequency information corresponding to the GUI component type that has been input from the table and returns it (step S602).

Upon receiving the update frequency information, the updating unit 16 determines whether to update compression property information or not for the GUI component type based on the information (step S603). Examples of update frequency information and a specific example of determination of whether to update compression property information or not are shown later.

If update should be performed (YES), the updating unit 16 calculates compression property information for the GUI component type (step S604). Compression property information can be calculated by obtaining the entire or a portion of the GUI component image of interest displayed on the desktop. In the example of FIG. 5, for example, the updating unit 16 obtains an image within a region corresponding to the GUI component type and compresses the image with both JPEG and PNG to calculate compression property information. Then, the updating unit 16 provides the compression property information storage 15 with the compression property information calculated to request update of compression property information (step S605).

The compression property information storage 15 updates compression property information for the GUI component type based on the request from the updating unit 16. In the example of FIG. 5, for example, defining an already stored compression ratio value as "OLD" (unit: %) and the compression ratio value input from the updating unit 16 as "IN" (unit: %), the compression property information storage 15 calculates NEW=(1−α)×OLD+α×IN, and overwrites and updates compression property information stored in itself with the value of compression ratio "NEW" (unit: %) calculated. The value "α" is a certain parameter ranging from 0 to 1. When "α"=1, for example, it means that compression property information should be overwritten with the value input from the updating unit 16 as is.

Upon completion of processing, the compression property information storage 15 notifies the updating unit 16 of the completion (step S606), with which this processing is completed. This processing is also terminated when it is determined that no update is performed at S603 (NO).

Hereinafter, we show several examples of update frequency information as well as instances of how the updating unit 16 determines whether to update compression property information or not for each of the examples.

FIG. 7 shows temporal trend of characteristics of image data (or image data characteristics) as a first example of update frequency information.

For example, it is shown that in a display portion of a document editing application, a relatively monotonic portion like characters and a natural image such as a picture appear together, or in a scroll bar portion of such an application, monotonic drawing takes place almost all the time. This information may be statically registered in advance, or may be dynamically determined and constantly updated by obtaining image data for GUI components during operation of a program including the updating unit 16.

Figure 8:
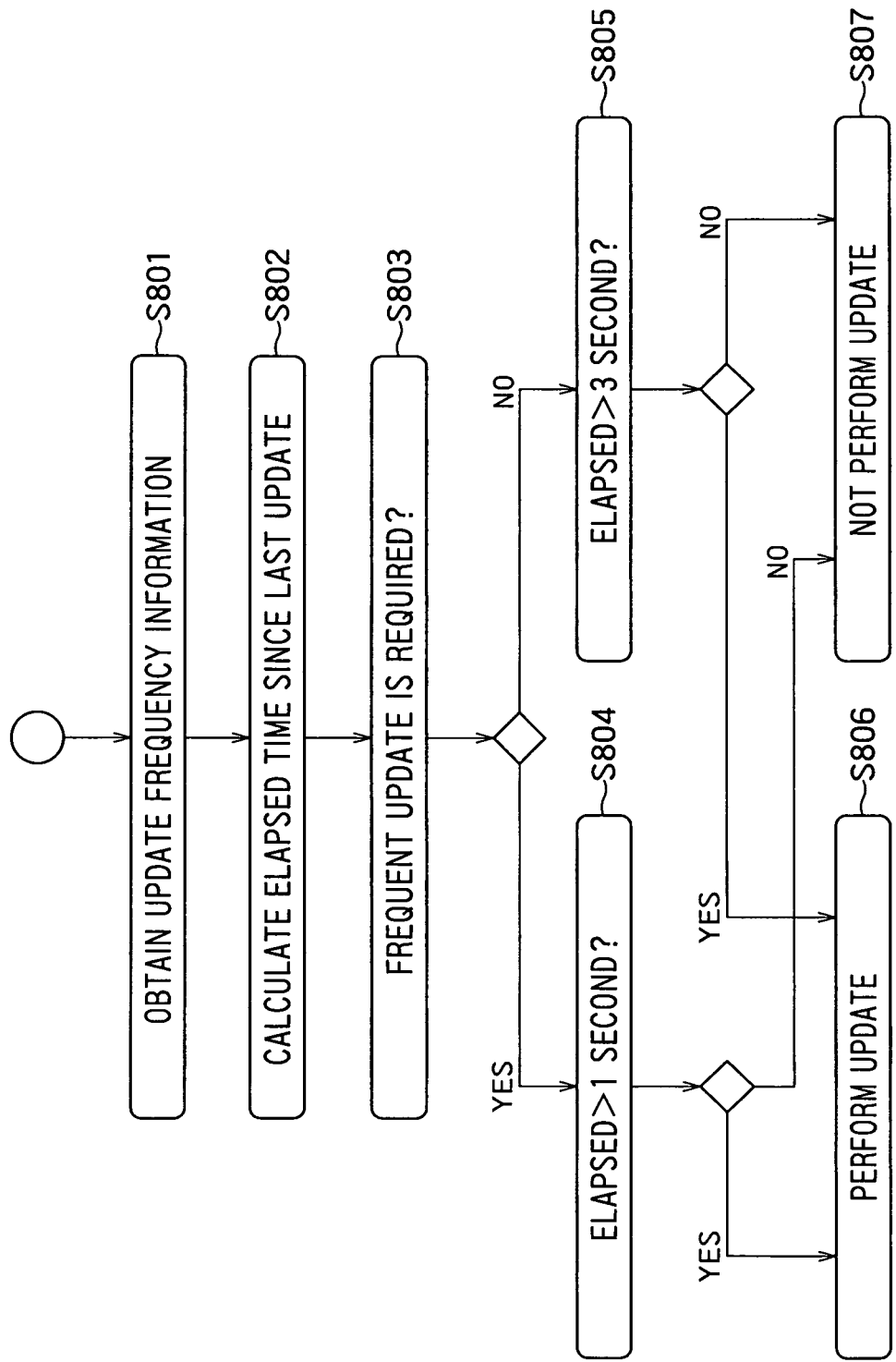
FIG. 8 is a flowchart illustrating a flow of processing for determining whether to update compression property information or not.

FIG. 8 shows a detailed flow of determination by the updating unit 16 of whether to perform update or not (S603 in FIG. 6).

The updating unit 16 obtains update frequency information from the update frequency information storage 17 for each GUI component type (S801), and calculates an elapsed time since the last update of compression property information (S803).

The updating unit 16 determines whether frequent update is necessary or not for each GUI component type (S803). In the case shown in FIG. 7, the updating unit 16 determines that frequent update of compression property information is necessary for a display portion in which a monotonic image and a natural image appear together, whereas not necessary (i.e., updating may be at relatively long time intervals) for a scroll bar portion in which a monotonic image is displayed all the time.

When frequent update is necessary (YES at S803), if an elapsed time since the last update calculated at S802 exceeds a predetermined time period (e.g., one second) (YES at S804), the updating unit 16 determines that update should be performed (S806), and if the predetermined time period has not been exceeded (NO at S804), the updating unit 16 determines that update should not be performed yet (S807).

When frequent update is not necessary (NO at S803), if the elapsed time since the last update calculated at S802 exceeds a longer predetermined time period (e.g., three seconds) at S804 (YES at S805), the updating unit 16 determines that update should be performed (S806). If the longer predetermined time period has not been exceeded (NO at S805), the updating unit 16 determines that update should not be performed yet (S807).

In this way, update frequency of compression property information can be adjusted for each GUI component type based on the temporal trend of characteristics of image data (or image data characteristics), which consequently can reduce the frequency of update for a GUI component type that does not require frequent updating. Therefore, CPU load can be reduced while keeping accuracy of compression property information high even in a desktop environment in which magnitude of variation in compression property information differs from one GUI component to another.

FIG. 9 shows past history of compression schemes as a second example of update frequency information. This example shows history of five selections made in the past.

This information may be created by calculating by the updating unit 16 compression ratios with JPEG and PNG for a GUI component type in question at step S604 of FIG. 6 and notifying the update frequency information storage 17 of a compression scheme with which a higher compression ratio was obtained. Based on update frequency information thus created, the updating unit 16 can determine whether frequent update (see S803 of FIG. 8) of compression property information is necessary or not for the GUI component type in question at step S603 of FIG. 6.

More specifically, in the example shown, since JPEG was selected three times and PNG was twice out of a total of five selections made in the past for a display portion of a document editing application, it can be determined that characteristics of image data is relatively variant and frequent updating is required in this portion (YES at S803). For a scroll bar portion, on the other hand, PNG was chosen in all of the five selections and thus it can be determined that this portion does not require frequent update (NO at S803). After the determination, necessity of updating can be determined with a short elapsed time as a threshold value for a GUI component type that requires frequent update (S804) as in the example shown in FIG. 7.

Alternatively, as another way of determination, since change from PNG to JPEG has occurred twice and change from JPEG to PNG has occurred once, i.e., a total of three changes have occurred in the display portion of the document editing application, it may be determined that frequent update is required (YES at S803) when a number of changes exceeding a predetermined threshold (e.g., twice) has occurred.

As described above, update frequency can be adjusted for each GUI component type also by utilizing history of selection results (i.e., a compression scheme with the highest compression ratio as calculated by the updating unit 16).

Figure 11:
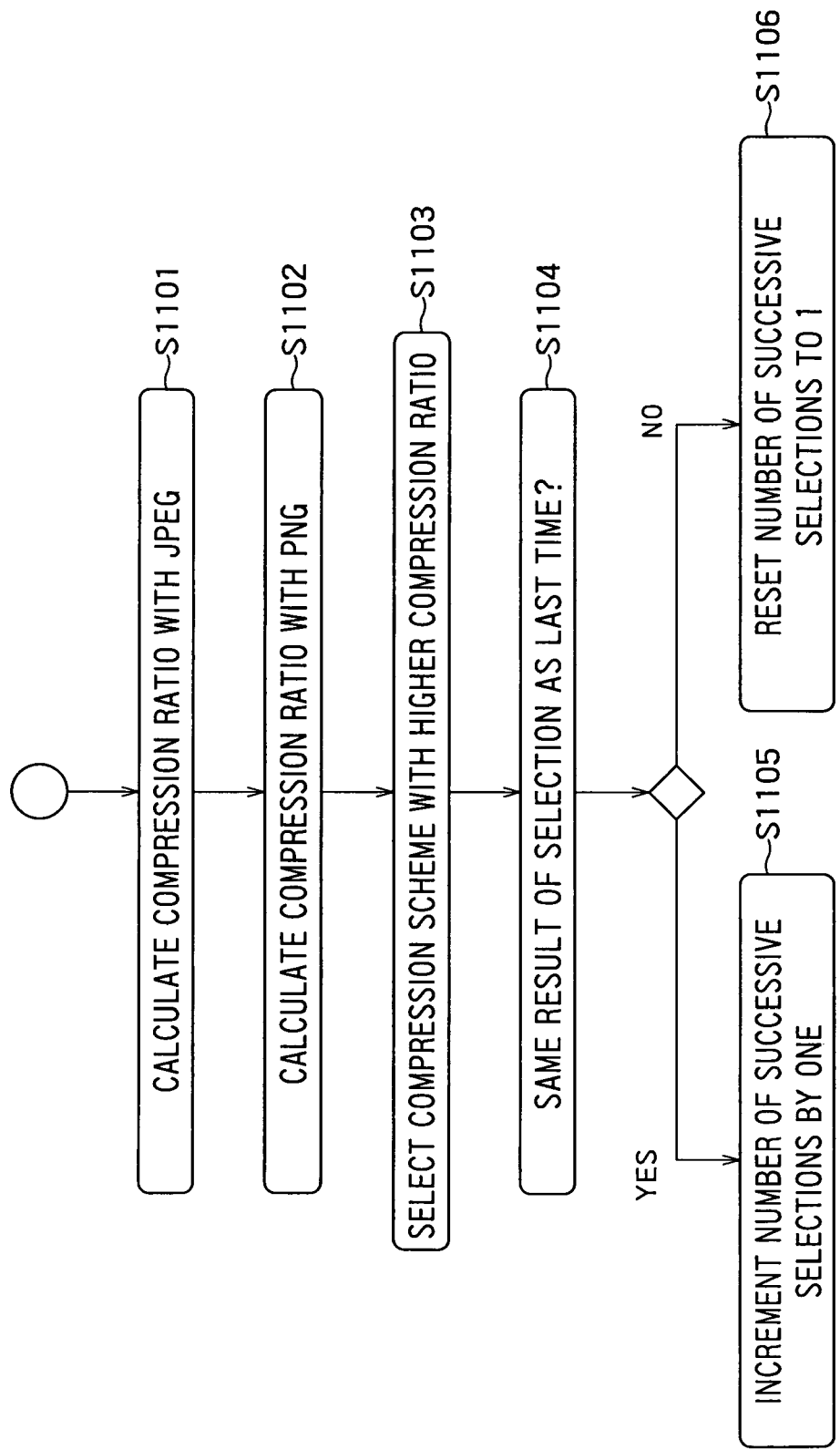
FIG. 11 is a flowchart illustrating processing for updating the update frequency information of FIG. 10.

As a method for adjustment of higher accuracy, the threshold value of elapsed time until update of compression property information may be changed to a larger value if the same compression scheme was selected in succession for a certain GUI component type. An example (a third example) of update frequency information that is stored in the update frequency information storage 17 in such a case is shown in FIG. 10. This update frequency information consists of a compression scheme (either JPEG or PNG) and the number of successive selections (an integer value). In the initial state, the compression scheme is either JPEG or PNG and the number of successive selections is set to 0. This information may be created by the updating unit 16 by following the flow of FIG. 11 at step S604 of FIG. 6, which is specifically as follows.

The updating unit 16 calculates compression ratios with JPEG and PNG for a GUI component type in question (S1101 and S1102), and selects a compression scheme providing a higher compression ratio (S1103).

The updating unit 16 memorizes the compression scheme that was last selected and determines whether the compression scheme selected this time is the same as the last selected one (step S1104).

If the schemes are the same (YES), the updating unit 16 requests the update frequency information storage 17 to increment the number of successive selections for the GUI component type by one (step S1105).

If the schemes are not the same (NO), the updating unit 16 requests the update frequency information storage 17 to overwrite the compression scheme stored in the unit 17 with the compression scheme selected this time and reset the number of successive selections to 1 (step S1106).

Based on update frequency information thus created, the updating unit 16 can take the number of successive selection into consideration when determining whether update is required or not at step S603 of FIG. 6. That is to say, as shown in FIG. 12, a table that associates the number of successive selections with the elapsed time threshold values is prepared and determination is made based on a threshold value associated with a certain number of successive selections. In this table, the smaller the number of successive selection is, a smaller threshold value is associated, and the larger the number of successive selection is, a larger threshold value is associated. Therefore, when the number of successive selection is small, determination is made with a small threshold value of elapsed time, and when the number of successive selection is large, determination is made with a large threshold value of elapsed time.

For example, for a GUI component type for which an efficient compression scheme rarely changes and remains PNG (i.e., the number of successive selections is large) like "document editing: scroll bar portion" of FIG. 10, the update time interval in compression property information is long. For a GUI component type for which an efficient compression scheme changes relatively frequently (i.e., the number of successive selections is small) like "document editing: display portion", the update time interval in compression property information is short.

The above-described procedure enables highly accurate adjustment of update frequency that reflects results of recent selections of a compression scheme.

FIG. 13 shows past history of compression property information as a fourth example of update frequency information. This example assumes a case where compression ratios with JPEG and PNG are adopted as compression property information as in FIG. 5.

The updating unit 16 calculates compression ratios with JPEG and PNG for the GUI component type in question at step S604 of FIG. 6 and inputs the values to the update frequency information storage 17. In the example shown, results of three calculations performed in the past are recorded. The updating unit 16 makes reference to the past history at step S603 of FIG. 6 to incorporate an average trend in the past relating to the characteristics of the image data into determination. More specifically, from the range of variation in compression ratio in the past, the updating unit 16 calculates the difference between the maximum and minimum values of the range for each of JPEG and PNG, and determines that frequent update is not necessary if both the differences are equal to or smaller than a predetermined threshold value (a first threshold) (e.g., 20%) and is necessary otherwise (i.e., at least one of the differences is above the predetermined threshold value). Effects similar to the ones described above can also be obtained by using such a method.

FIG. 14 shows the update frequency information shown in FIG. 13 further combined with the time of their calculation (defined as an elapsed time since application start-up, in milliseconds) as a fifth example of update frequency information.

The updating unit 16 may get the current time when making determination at step S603 of FIG. 6 and apply such processing as not to consider old data for which "current time–time of calculation" exceeds a predetermined time period, at the time of determination.

As an example, suppose it is specified that data with an elapsed time since the time of its calculation reaching or exceeding 15,000 milliseconds is not considered in determination. In this case, when processing at step S603 is to be performed on "document editing: display portion", assuming that the current time is 55000, similar processing to that shown in FIG. 13 is performed ignoring data of time 1 whose calculation time is before 40000. Thus, by using only recently obtained data, it is possible to increase the accuracy of determination.

Examples of update frequency information have been thus far shown.

While determination of whether the updating unit 16 should perform update or not is made based on whether an elapsed time since the last update exceeds a threshold or not (see S804 and S805 in FIG. 8) so far, this determination may also be made according to a criterion other than elapsed time. For example, the area of image data is accumulated every time screen information is generated by the screen information generating unit 11 and whether the cumulative area has exceeded a certain threshold (a second threshold) or not may be used as a criterion of determination. A processing procedure in this case is described using FIGS. 15, 16, and 17. However, the description here adopts the number of successive selections which was described in FIG. 10 as update frequency information.

Figure 15:
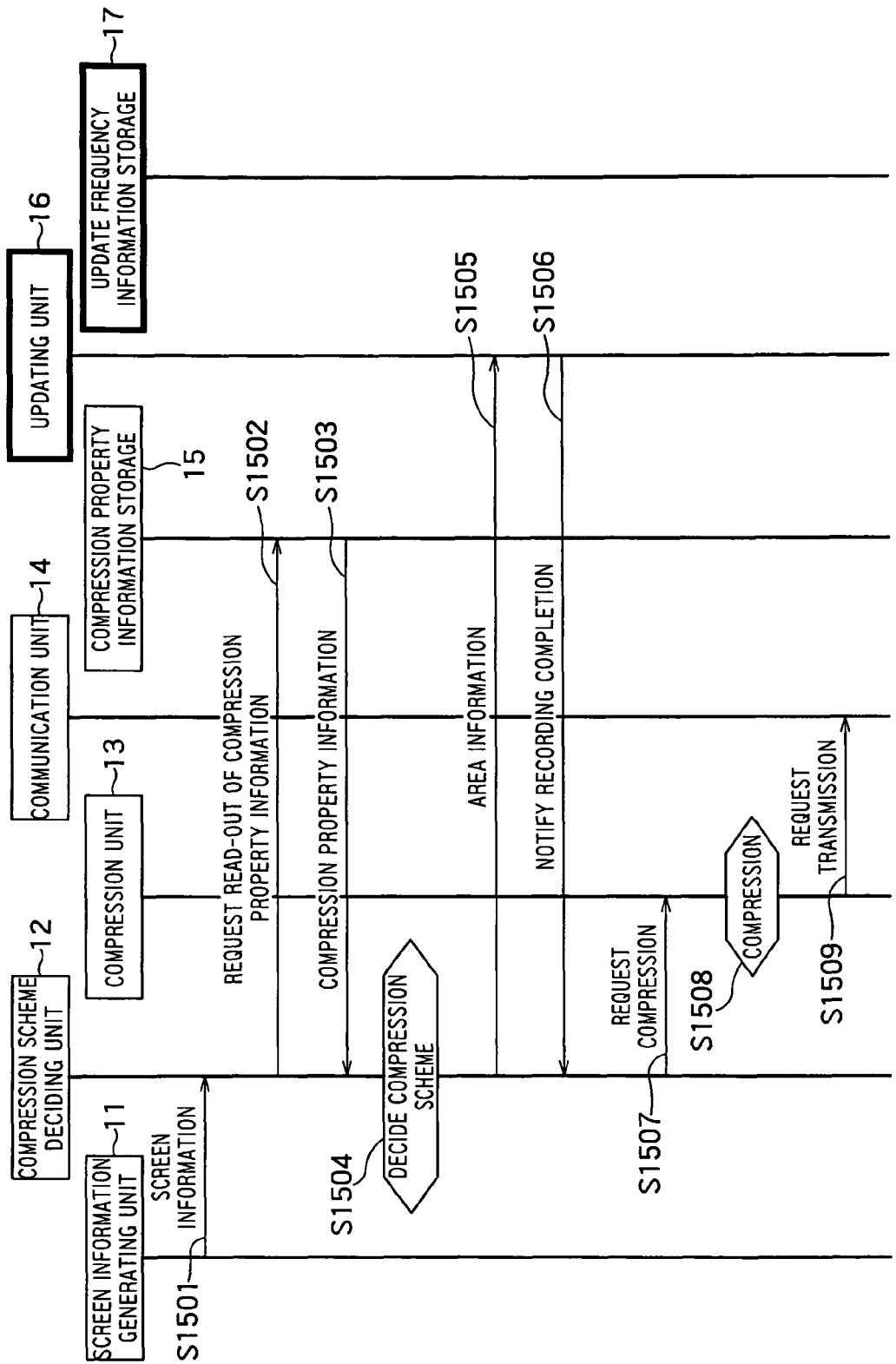
FIG. 15 is a sequence chart illustrating another example flow of processing from generation of image data to data transmission which are performed on the server.

FIG. 15 shows an example of an operational sequence between the screen information generating unit 11, compression scheme deciding unit 12, compression unit 13, communication unit 14, compression property information storage 15, and updating unit 16.

After deciding a compression scheme as in the procedure shown in FIG. 3 (steps S1501 to S1504), the compression scheme deciding unit 12 calculates the area of image data from rectangular position information included in screen information. The calculated area and the type of the GUI component are collectively defined as area information.

The compression scheme deciding unit 12 notifies the updating unit 16 of the area information to request recording of the area information (step S1505).

The updating unit 16 records and accumulates the area value included in the area information received for each GUI component type.

The compression scheme deciding unit 12 receives notification of recording completion from the updating unit 16 (step S1506), and thereafter requests the compression unit 13 for compression as in FIG. 3 (step S1507). The compression unit 13 compresses the image data and requests the communication unit 14 to transmit data including the compressed data, position information, and the compression scheme.

Figure 17:
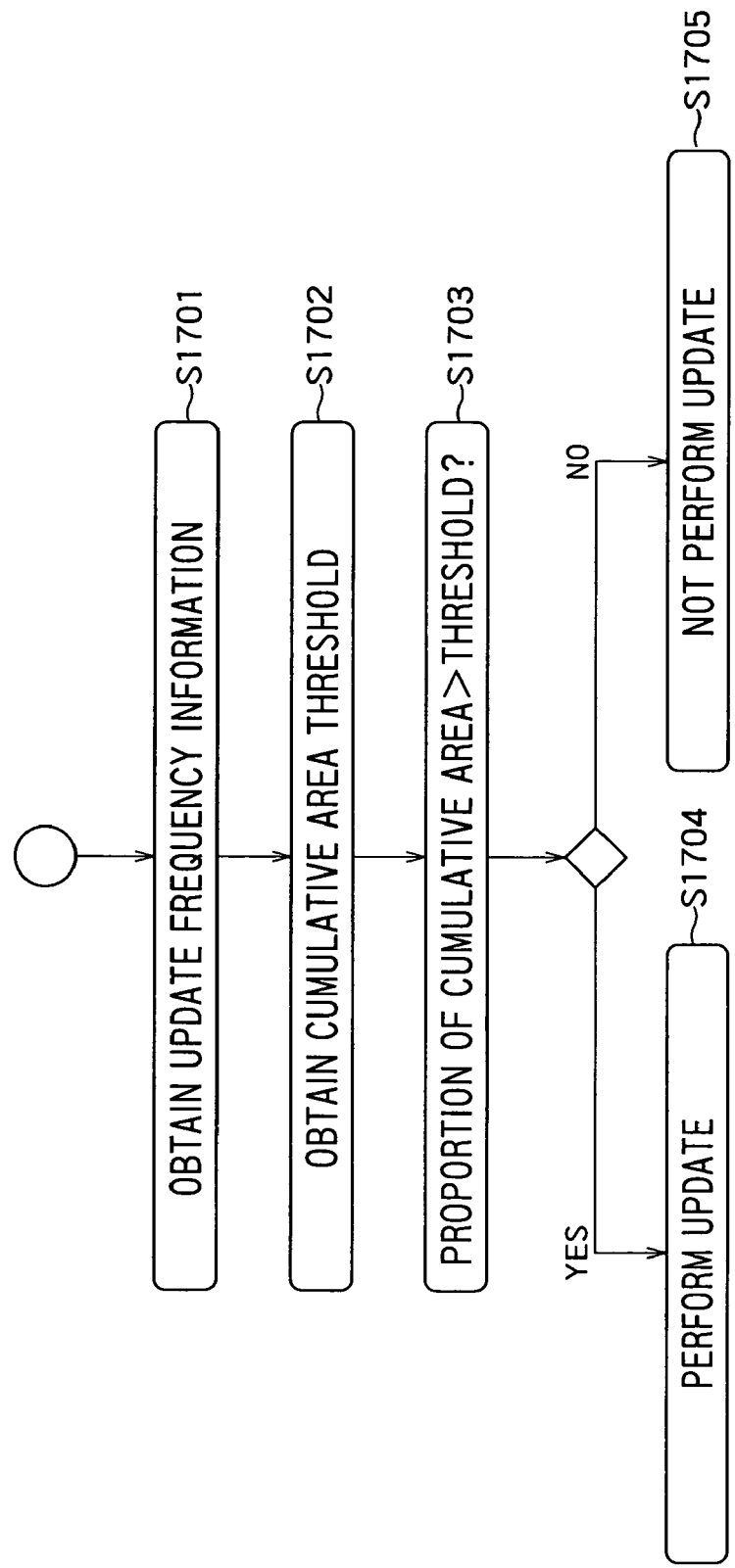
FIG. 17 is a flowchart illustrating another example flow of processing for determining whether to update compression property information or not.

Meanwhile, the updating unit 16 determines whether to update compression property information or not according to the procedure shown in FIG. 17 at S603 of FIG. 6 at arbitrary repetition time interval.

The updating unit 16 first retrieves the number of successive selections as update frequency information from update frequency information storage 17 for a certain GUI component type (step S1701), and reads a cumulative area threshold (a second threshold) corresponding to the number of successive selections with reference to the table illustrated in FIG. 16 (step S1702). The table associates the numbers of successive selections with cumulative area thresholds (second thresholds), where thresholds get larger as the number of successive selection increases and thresholds get smaller as the number of successive selection decreases.

The updating unit 16 then retrieves from an OS the area occupied by the GUI component of interest on the desktop, and calculates the proportion of the cumulative area recorded at step S1505 to that area. The updating unit 16 may have a cumulative area calculating unit for calculating the cumulative area of image data or the proportion of the cumulative area to a region occupied by a GUI component type of interest on the screen.

Then, the updating unit 16 compares the threshold value (the second threshold) read out at step S1702 with the proportion of the cumulative area (step S1703). If the proportion of the cumulative area has exceeded the threshold value (YES), the updating unit 16 determines that update of compression property information is necessary (step S1704), and if not, it determines that update is not necessary (step S1705). While necessity of update is determined based on the relation between the proportion of the cumulative area and the threshold value here, the determination may be based on the relation between the cumulative area and a threshold value.

As described above, by determining whether to update compression property information based on the cumulative value of areas of image data generated by the screen information generating unit 11, it is expected to have an effect of more focused update of compression property information corresponding to a GUI component type for which drawing takes place with a high frequency.

As described above, according to the present embodiment of the invention, a frequency of update to compression property information can be set separately for each GUI component type in accordance with the magnitude of variation in compression property information. It is accordingly possible to prevent unnecessary update of compression property information in a desktop environment in which the magnitude of variation in compression property information differs from one GUI component to another. As a result, a compression scheme to be applied to image data can be appropriately selected while reducing CPU load.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. A server that compresses image data in at least a partial region of a displayed image on a screen including graphical user interface (GUI) components of plural types and transmits compressed data to a client terminal, the server comprising:
   an image data generating unit configured to generate image data in at least a partial region of a displayed image on the screen;
   a type identifying unit configured to identify a type of a GUI component included in the region of the generated image data;
   a first storage configured to store compression property information of image data for each type of GUI component;
   a compression scheme deciding unit configured to decide a compression scheme based on compression property information corresponding to the GUI component type identified by the type identifying unit;
   a compression unit configured to compress the generated image data with a decided compression scheme to generate compressed data;
   a transmission unit configured to transmit the compressed data to the client terminal;
   an update frequency deciding unit configured to decide an update frequency of the compression property information corresponding to each type of the GUI component in the first storage; and
   an updating unit configured to update the compression property information corresponding to the update frequency decided for each type of the GUI component.

2. The server according to claim 1, wherein the update frequency deciding unit decides the update frequency in accordance with a characteristic of a displayed image for each type of the GUI component.

3. The server according to claim 1, further comprising a second storage, wherein
   the compression scheme deciding unit decides a compression scheme from among a plurality of compression schemes based on the compression property information corresponding to the GUI component type identified by the type identifying unit,
   the update frequency deciding unit compresses the generated image data with each of the compression schemes and calculates compression ratios by the compression schemes,
   the second storage stores a compression scheme providing a highest compression ratio among calculated compression ratios, for each type of the GUI component, and
   the update frequency deciding unit decides the update frequency based on a history of compression schemes stored in the second storage, for each type of the GUI component.

4. The server according to claim 3, wherein
   the update frequency deciding unit decides the update frequency based on ratios at which the compression schemes appear in the history, for each type of the GUI component.

5. The server according to claim 3, wherein
   the update frequency deciding unit decides the update frequency based on a change number to a different compression scheme in the history, for each type of the GUI component.

6. The server according to claim 3, wherein
the update frequency deciding unit decides the update frequency based on the number of times a same compression scheme appears in succession tracing back from a last compression scheme in the history, for each type of the GUI component.

7. The server according to claim 1, further comprising a second storage, wherein
the compression scheme deciding unit decides a compression scheme from among a plurality of compression schemes based on the compression property information corresponding to the GUI component type identified by the type identifying unit, and
the update frequency deciding unit compresses the generated image data with each of the compression schemes and calculates compression ratios by the compression schemes,
the second storage stores the calculated compression ratios by the compression schemes, for each type of the GUI component, and
the update frequency deciding unit decides the update frequency based on a history of compression ratios by the compression schemes, for each type of the GUI component.

8. The server according to claim 7, wherein
the update frequency deciding unit
calculates a difference between maximum and minimum values of the compression ratio for each of the compression schemes in the history, for each type of the GUI component and
decides the update frequency based on whether the difference calculated for each of the compression schemes is equal to or greater than a first threshold, for each type of the GUI component.

9. The server according to claim 7, wherein
the second storage stores the calculated compression ratios in association with a calculation time, for each type of the GUI component, and
the update frequency deciding unit
identifies data having the calculation time since which a predetermined time period has not elapsed yet, in the history, for each type of the GUI component and
decides the update frequency by using only data identified in the history, for each type of the GUI component.

10. The server according to claim 1, wherein
the update frequency is an update time interval.

11. The server according to claim 1, further comprising
a cumulative area calculating unit configured to calculate, for each type of the GUI component, a cumulative area of the generated image data or a proportion of the cumulative area to a region occupied by the GUI component type on the screen, wherein
the updating unit updates the compression property information when the cumulative area or the proportion of the cumulative area has exceeded a second threshold, for each type of the GUI component and
the update frequency deciding unit decides the second threshold value as the update frequency, for each type of the GUI component.

12. A screen transmitting method in which a server compresses image data in at least a partial region of a displayed image on a screen including graphical user interface (GUI) components of plural types and transmits compressed data to a client terminal, the method comprising:
generating, by the server, image data in at least a partial region of a displayed image on the screen;
identifying, by the server, a type of a GUI component included in the region of the generated image data;
reading out, by the server, compression property information corresponding to an identified GUI component type from a first storage which stores compression property information of image data for each type of GUI component and deciding a compression scheme based on the compression property information read out;
compressing, by the server, the generated image data with a decided compression scheme to generate compressed data;
transmitting, by the server, the compressed data to the client terminal;
deciding, by the server, an update frequency of the compression property information corresponding to each type of the GUI component in the first storage; and
updating, by the server, the compression property information corresponding to each of the GUI component types with the update frequency decided for each of the GUI component types.

13. A non-transitory storage medium storing a computer program for causing a computer, which compresses image data in at least a partial region of a displayed image on a screen including graphical user interface (GUI) components of plural types and transmits compressed data to a client terminal, to perform steps comprising:
generating image data in at least a partial region of a displayed image on the screen;
identifying a type of a GUI component included in the region of the generated image data;
reading out compression property information corresponding to an identified GUI component type from a first storage which stores compression property information of image data for each type of GUI component and deciding a compression scheme based on the compression property information read out;
compressing the generated image data with a decided compression scheme to generate compressed data;
transmitting the compressed data to the client terminal;
deciding an update frequency of the compression property information corresponding to each type of the GUI component in the first storage; and
updating the compression property information corresponding to the update frequency decided for each type of the GUI component.

* * * * *